United States Patent Office 3,737,447
Patented June 5, 1973

3,737,447
CARBYLOXY-METHYLENE-SULFONATES, THEIR PREPARATION AND USE IN SYNTHESES
Yehuda Mazur, Tel Aviv, Israel, and Michael H. Karger, Stanmore, England, assignors to Yeda Research and Development Co., Ltd., Rehovoth, Israel
No Drawing. Filed Feb. 13, 1970, Ser. No. 11,349
Int. Cl. C07c *143/68*
U.S. Cl. 260—456 R  2 Claims

ABSTRACT OF THE DISCLOSURE

New ether sulfonates of the general formula $$R_1O-CH_2O-SO_2R_2$$

in which $R_1$ and $R_2$ are each an unsubstituted or substituted alkyl, cycloalkyl, aralkyl, aryl or heteroalkyl radical. The compounds are valuable for carrying out various chemical reactions such as oxyalkylation, splitting of ethers, preparation of amines and the like.

---

The present invention concerns new ether sulfonates of the general formula $$R_1O-CH_2-O-SO_2R_2 \qquad (I)$$

where $R_1$ and $R_2$ may be the same or different and are each an alkyl, cycloalkyl or aralkyl radical each of which may comprise one or more hetero atoms or an aryl or heterocyclic radical, each of which radicals may be substituted. It has been found that the above new compounds of Formula I are especially useful as ready sources of carbyloxy-methylene groups $R_1O-CH_2-$ where $R_1$ is as above, for attachement at nucleophilic sites in a wide variety of organic compounds. Mostly the above novel compounds may be used for these purposes directly in the crude form in which they are obtained.

The ether sulfonates of Formula I may be prepared by reacting a formic acetal of the general formula $$CH_2(OR_1)_2 \qquad (II)$$

where $R_1$ is as above, with a mixed carboxylic-sulfonic anhydride of the general formula $$R_3CO-O-SO_2R_2 \qquad (III)$$

where $R_2$ is as above and $R_3$ is an alkyl, cycloalkyl or aralkyl radical which may comprise one or more hetero atoms or an aryl or heterocyclic radical all of which radicals may be substituted, according to the equation

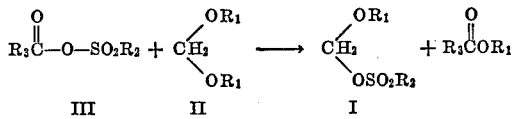

The reaction is conducted by admixing compounds II and III in substantially equimolar proportions at room temperature, under anhydrous conditions and preferably under an inert atmosphere (e.g. nitrogen gas).

An inert aprotic solvent may be used if necessary, for example when either of the reactants or both are solids under the reaction conditions.

The reaction is virtually completed within minutes, and the carboxylic ester which is the second reaction product may be removed by distillation under vacuum at room temperature, leaving in the reaction vessel the carbyloxy-methylene sulfonate (I), usually containing traces of sulfonic acid and sulfonic anhydride as impurities.

If desired, the product I may be purified by any one of the conventional methods. In the case where $$R_1=R_2=R_3,$$

for example, the methoxy methylene mesylate obtained is purified by careful distillation under high vacuum at a bath temperature not exceeding 130° C. However, as stated above, the ethersulfonates of Formula I can be used in many of their synthetic applications, described hereinafter, in the crude form in which they are obtained by the above described reaction.

The carbyloxy-methylene sulfonates of Formula I are fairly thermo-stable, but on being heated to higher temperatures (external bath above about 130° C.), they decompose according to the equation:

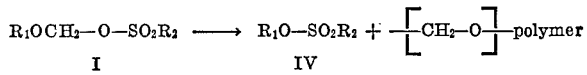

This reaction can be usefully applied to the preparation of pure sulfonate mono-esters of Formula IV of definite desired structure. The decomposition is best carried out by carefully heating in vacuo a compound of Formula I above its decomposition point.

The carbyloxy-methylene sulfonates of Formula I are extremely moisture-sensitive and upon contact with water they hydrolyse according to the equation:

$$R_1OCH_2-SO_2R_2+H_2O \rightarrow R_1OH+R_2SO_3H+CH_2O$$

Their alcoholysis is likewise very facile and fast. With primary, secondary or tertiary alcohols an immediate exothermic reaction ensues, which is complete within minutes. This reaction is represented by the equities:

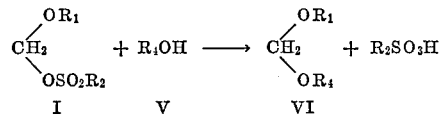

where $R_1$ and $R_2$ are as defined above and $R_4$ is an alkyl, cycloalkyl or aralkyl radical which may comprise hetero atoms, or an aryl or heterocyclic radical, all of which radicals may be substituted.

The products—a mixed formic acetal of Formula VI on the one hand, and a sulfonic acid on the other hand—can be separated from each other by conventional techniques, such as distillation, extraction with aqueous base, etc.

The last mentioned reaction has at least two important applications:

(1) It provides a convenient and mild process for the synthesis of formic acetals of Formula VI in high yield. These compounds have hitherto been prepared by the reaction of α-haloalkyl ethers with sodium alkoxides, which necessitates the prior formation of the sodium alkoxide, with all its inherent disadvantages.

(2) It provides a convenient method for the protection of a hydroxyl group in an organic molecule $R_4OH$ by its ready conversion into a carbyloxy-methylene ether of Formula VI. This grouping is inert towards basic reagents, to which some other function in the same molecule may be subjected. Subsequently the intact hydroxyl function may be regenerated in a theoretical yield by acid hydrolysis.

In an analogous fashion the new carbyloxy-methylene sulfonates of structure I can be used for the convenient preparation of N-(carbyloxy-methylene) derivatives of Formula VIII by reaction with primary and secondary amines of Formula VII according to the equation:

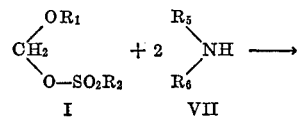
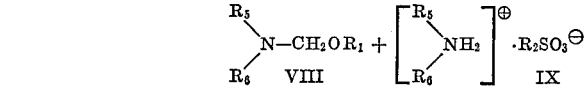

where $R_5$ and $R_6$ may be the same or different and are each an alkyl, cycloalkyl or aralkyl radical which may comprise heteroatoms, or an aryl or heterocyclic radical, all of which radicals may be substituted, either $R_5$ or $R_6$ may also be a hydrogen atom, or $R_5$ and $R_6$ together with the nitrogen atom to which they are attached form a ring.

The reaction is immediate and requires two mole equivalents of the amine of Formula VII for each mole of the carbyloxy-methylene sulfonate of Formula I. Together with the carbyloxy-methylene amine of Formula VIII there forms a sulfonate salt of Formula IX which precipitates if the reaction is carried out in a non-polar solvent and can be readily removed by filtration, leaving the N-carbyloxy-methylene)-amine VII in solution.

These amine derivatives of Formula VIII are valuable compounds per se. Their preparation may also serve for the temporary protection of the amino group of compound VII, as they are readily and quantitatively reconverted into the free amines upon contact with water.

The carbyloxy-methylene sulfonates of Formula I are capable of attacking the nucleophilic oxygen atom of a variety of ethers, causing cleavage of an etheric carbon-oxygen linkage, according to the equation:

Acyclic ethers

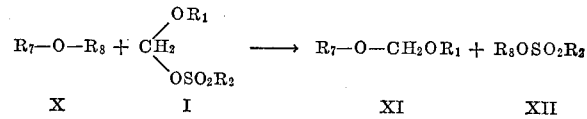

Cyclic ethers

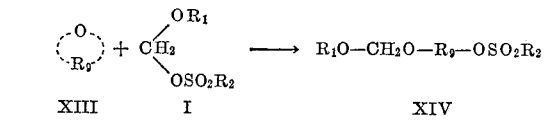

In the above equation $R_7$ and $R_8$ are hydrocarbyl radicals, and $R_9$ is a hydrocarbylene radical, all of which may be substituted and may comprise hetero-atoms.

The reaction conditions are dependent on the nature of the ether substrate: in some cases, for example with benzylethyl ether the reaction is exothermic and proceeds spontaneously at room temperature. In another case, e.g. with tetrahydrofuran, it is necessary to reflux the reaction mixture for the completion of the reaction. In all cases, however, this new method for the cleavage of ethers constitutes a great improvement over the hitherto known methods, according to which strong Lewis acid catalysts and high temperatures had to be employed.

In the case of unsymmetrical acyclic ethers, i.e. where $R_7$ and $R_8$ are different, or in the case of cyclic ethers where $R_9$ is unsymmetric in respect to a hetero-atom which it may comprise or unsymmetrically substituted, it was observed that the cleavage is usually specific. This means that only one kind of carbyloxymethylene ether of Formula XI and one kind of mono sulfonate ester of Formula XII are obtained from an acyclic ether of Formula X, and only one kind of a compound of Formula XIV is obtained from a cyclic ether of Formula XIII. Thus, for example, the cleavage of benzylic ethers proceeds uni-directionally as follows:

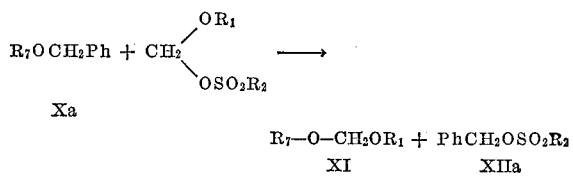

$$R_7-O-CH_2OR_1 + PhCH_2OSO_2R_2$$
$$\text{XI} \qquad \text{XIIa}$$

This specificity is an important feature of the reaction when applied for the preparation of specific compounds of Formulae XI, XII and XIV.

The new compounds of Formula I are also useful reagents for the preparation of diarylmethanes by a reaction which proceeds under mild conditions, presumably via a Friedel-Crafts-type substitution of the aromatic nucleus, according to the following equations:

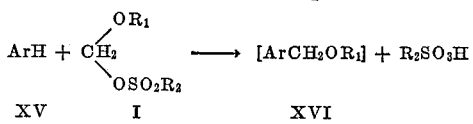

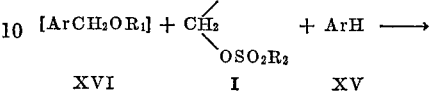

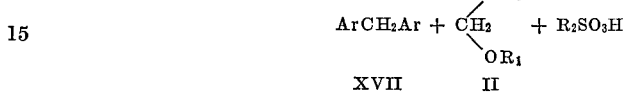

where Ar stands for any substituted or unsubstituted aromatic radical or heterocyclic radical of aromatic character. The overall reaction produces also the acetal II and two moles of the corresponding sulfonic acid $R_2SO_3H$, and may be represented as follows:

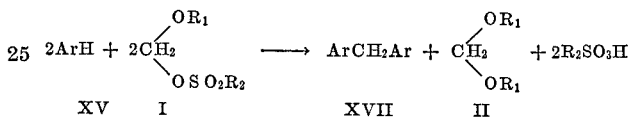

This reaction proceeds at room temperature and as a rule no catalyst is required. These facts and the good yields of this reaction render it highly suitable for synthetic application.

EXAMPLE 1

Preparation of methoxy-methylene-mesylate 30 g. (0.394 mole) of dry dimethoxymethane were added gradually over 20 minutes to 52.5 g. (0.38 mole) of acetyl mesylate (for preparation of P. 29873) which were stirred at 0° under nitrogen. The reaction mixture was allowed to reach room temperature and maintained thus for additional 30 min. Upon distillation at room temperature under $10^{-2}$ mm. Hg 27.0 g. (96% of methyl acetate were obtained. The bath temperature was then raised to 120° (maintaining the pressure at $10^{-2}$ mm. Hg) when pure methoxy-methylene-mesylate, B.P. 75–82°, distilled as a colourless, extremely hygroscopic liquid, in a yield of 60%. Its n.m.r. spectrum showed three singlets at $\delta 3.10$ (3H, $OSO_2C\underline{H}_3$), 3.60 (3H, $OC\underline{H}_3$) and 5.38 p.p.m. (2H, $OC\underline{H}_2O$). An acidic proton signal at $\delta 10.33$ p.p.m. indicated the presence of methane sulfonic acid as a contaminant, in about 8% concentration, as estimated from the integrated intensity of this proton signal.

EXAMPLE 2

The thermal conversion of methoxy-methylene-mesylate into methyl mesylate

Methoxy - methylene - mesylate was found to be thermally stable and withstood heating for short periods up to 130°. However, in distillations where oil bath temperatures above 130° were maintained for larger periods, the distillate contained variable proportions of methyl mesylate. This product could be identified in the mixture with methoxy-methylene mesylate by its n.m.r. spectrum, characterised by two singlets at $\delta 3.04$ (3H, $OSO_2C\underline{H}_3$) and 3.92 p.p.m. (3H, $OC\underline{H}_3$).

EXAMPLE 3

(a) Reaction of methoxy-methylene-mesylate with ethanol 3.6 g. of methoxy-methylene-mesylate (18.8 mmole) were added to 867 mg. of pure dry ethanol (18.8 mmole) at room temperature. An immediate exothermic reaction occurred after which the reaction mixture was kept at room temperature for 5 min., cooled to $-186°$ and distilled in a closed system at room temperature and $10^{-2}$ mm. Hg pressure. The colourless distillate (1.45 g., 86%) consisted of pure methoxy ethoxy methane. The n.m.r. spectrum showed a triplet (J=7 c.p.s.) at δ1.17 (3H, $CH_2CH_3$), a sharp singlet at 3.28 (3H, $OCH_3$), a quartet (J=7 c.p.s.) at 3.55 (2H, $OCH_2CH_3$) and an overlapping doublet pair (J=3 c.p.s.) at 4.56 p.p.m. (2H,

$ROCH_2OR'$)

The residue consisted of methane sulphonic acid only.

(b) Reaction of methoxy-methylene mesylate with isopropanol

According to the same procedure described in Example 3a above, the reaction of methoxy-methylene mesylate and isopropanol yielded methoxy isopropoxy methane (82% yield) and methane sulfonic acid. The n.m.r. spectrum of the former showed a doublet (J=6 c.p.s.) at δ1.13 [6H, $CH(CH_3)_2$], a singlet at 3.31 (3H, $OCH_3$), a septet (J=6, c.p.s.) centered at 3.82 [1H, $CH(CH_3)_2$] and two overlapping doublets (J=4 c.p.s.) centered at δ4.60 p.p.m. (2H, $OCH_2O$).

EXAMPLE 4

Reaction of methoxy-methylene mesylate and pyrrolidine

A solution of 2.7 g. pyrrolidine (38 mmole) in 25 ml. of dry ether was added to a stirred solution of 2.6 g. methoxy methylene mesylate (18.6 mmole) in 25 ml. of ether. An immediate heavy precipitate of the methane sulphonate salt of pyrrolidine (3.0 g., 97%) was filtered off and the filtrate was carefully evaporated under reduced pressure, yielding 1.7 gr. of an oil consisting of a mixture of pyrrolidine and methoxy-methyl pyrrolidine in a rough ratio of 3:2 respectively. The n.m.r. spectrum of this oil showed singlets at δ3.35 ($OCH_3$), 4.13 p.p.m. ($OCH_2N$) and two complex signals at 1.7 ($CH_2$) and 2.55 p.p.m. ($NCH_2$) superimposed on the n.m.r. spectrum of pyrrolidine [singlet at 3.20 ($NH$), multiplets at 1.7, 2.55 p.p.m.].

Treatment of the oil with water and extraction with ether afforded only pure pyrrolidine.

EXAMPLE 5

(a) Reaction of methoxy-methylene mesylate with tetrahydrofuran 2.0 g. of methoxy-methylene mesylate (14.3 mmole) were refluxed in a large excess of dry tetrahydrofuran (25 ml.) for 24 hr. Evaporation of the excess solvent gave a brown oil (3.0 g., 99%), in which no tetrahydrofuran or methoxy-methylene mesylate could be detected by the n.m.r. spectrum (which however showed the presence of methane sulphonic acid). The oil was dissolved in ether and the solution was extracted three times with 5% aqueous bicarbonate solution. After washing with water and drying over sodium sulphate, the residual ethereal solution was filtered and evaporated to dryness under reduced pressure yielding an oil (850 mg., 30%). This oil was distilled at 180°/$10^{-2}$ mm. Hg affording pure 1-methane sulphonyl-4-methoxy methylene-butane-1,4-diol. The n.m.r. spectrum comprised a complex signal at δ 1.8 (4H, $CH_2$), a singlet at 3.1 (3H, $OSO_2CH_3$), a singlet at 3.4 (3H, $OCH_3$) and multiplets at δ 3.50 (4H, $OCH_2$) and 4.3 p.p.m. (2H, $OCH_2O$). Methane sulphonic acid (singlets at δ 3.1 and 11.1) was also present, probably arising from thermal decomposition of the mesylate.

(b) Reaction of methoxy methylene mesylate with benzyl ethyl ether 2.3 g. of methoxy methylene mesylate (20 mmole) were added to 2.72 g. of benzyl ethyl ether (20 mmole) at room temperature. The exothermic reaction which ensued was allowed to proceed and the reaction mixture kept thereafter at room temperature for a further 30 min. Examination of the crude reaction mixture by n.m.r. showed the absence of the starting materials beyond the presence of a slight excess of benzyl ethyl ether. The signal due to the aryl protons is now broad and diffuse corresponding to polymerisation of a benzyl cationic species. The crude reaction mixture was distilled at room temperature at $10^{-2}$ mm. Hg, whereby 1.5 g. of methoxy ethoxy methane were collected as a colourless liquid (yield 83%). This product was identified by its n.m.r. spectrum which proved identical to that previously described.

EXAMPLE 6

(a) Reaction of methoxy methylene mesylate with benzene

A solution of 2.6 g. of methoxy methylene mesylate (18.8 mmole) in benzene (5.0 ml., excess) was kept at room temperature for 48 hr. after which time the reaction mixture had settled out into two layers. The excess benzene was evaporated and the residual oil was taken up in chloroform and extracted with water, 5% aqueous bicarbonate solution (3×) and again water, then it was dried over sodium sulphate, filtered and evaporated to yield a colourless oil (1.5 g., 48%) which was distilled at 100°/$10^{-2}$ mm. Hg to give pure diphenyl methane, which was found identical by infrared and n.m.r. spectra with an authentic sample.

(b) Reaction of methoxy methylene mesylate and toluene

A solution of 3.9 gr. of methoxy methylene mesylate (28.2 mmole) in an excess of toluene (15 ml.) was kept at room temperature for 6 hr., after which time two layers were visible. The lower of these was withdrawn and distilled at 160°/$10^{-2}$ mm. Hg giving pure methane sulphonic acid, identified by its n.m.r. spectrum.

The upper layer was evaporated to remove the excess of toluene and yielded a colourless oil (4.0 g., 72%) consisting of a mixture of isomers of di-tolyl methane, which was distilled at 100°/$10^{-2}$ mm. Hg. The n.m.r. spectrum showed peaks at δ 2.2, 2.6 ($CrCH_3$) 3.89, 3.87 ($ArCH_2Ar$) and 7.0, 7.2 ($ArH$) p.p.m.

We claim:
1. Methoxy-methylene mesylate.
2. A process for the preparation of methoxy-methylene mesylate comprising the step of reacting, under anhydrous conditions, dimethoxy methane with acetyl mesylate.

References Cited

UNITED STATES PATENTS

| | | |
|---|---|---|
| 3,190,906 | 6/1965 | Mueller et al. _____ 260—456 R |
| 2,172,606 | 9/1939 | Butler et al. _____ 260—456 P |

FOREIGN PATENTS

| | | |
|---|---|---|
| 1,135,898 | 9/1962 | Germany _____ 260—456 R |

OTHER REFERENCES

Chemical Abstracts, Seventh Collective Index (56–65), p. 765 (1962–66).

Karger et al.; JACS 91, 5663–65 (1969).

BERNARD HELFIN, Primary Examiner

L. B. De CRESCENTE, Assistant Examiner

U.S. Cl. X.R.

260—456 P, 468 R, 488 R, 488 CD, 488 J, 491, 501.1, 503, 505 R, 513 R, 563, 571, 573, 584, 611R, 612 R, 615 R, 617 R, 618 R, 619 R, 632 B, 668 R, 606